(12) United States Patent
Ritamäki et al.

(10) Patent No.: US 8,692,527 B2
(45) Date of Patent: Apr. 8, 2014

(54) METHOD AND ARRANGEMENT FOR EFFICIENTLY GENERATING CURRENT WITH A HIGH RATE OF CHANGE

(75) Inventors: Seppo Ritamäki, Masala (FI); Mika Sippola, Helsinki (FI)

(73) Assignee: Efore Oyj, Espoo (FI)

( * ) Notice: Subject to any disclaimer, the term of this patent is extended or adjusted under 35 U.S.C. 154(b) by 382 days.

(21) Appl. No.: 12/676,274

(22) PCT Filed: Sep. 4, 2008

(86) PCT No.: PCT/FI2008/050492
§ 371 (c)(1),
(2), (4) Date: Apr. 22, 2010

(87) PCT Pub. No.: WO2009/030818
PCT Pub. Date: Mar. 12, 2009

(65) Prior Publication Data
US 2010/0270990 A1    Oct. 28, 2010

(30) Foreign Application Priority Data
Sep. 4, 2007  (FI) ................................ 20070672

(51) Int. Cl.
*G05F 1/00*   (2006.01)
(52) U.S. Cl.
USPC .......................................... 323/269; 323/272
(58) Field of Classification Search
USPC ............ 323/271, 282–284, 269, 272; 363/65, 363/69, 70
See application file for complete search history.

(56) References Cited

U.S. PATENT DOCUMENTS

| | | | |
|---|---|---|---|
| 5,446,457 A | | 8/1995 | Ryat |
| 6,023,154 A | * | 2/2000 | Martinez ........................ 323/272 |
| 6,037,755 A | * | 3/2000 | Mao et al. ..................... 323/222 |
| 6,147,478 A | * | 11/2000 | Skelton et al. ................ 323/288 |
| 6,150,999 A | | 11/2000 | Chen et al. |
| 6,831,448 B2 | * | 12/2004 | Ishii et al. ..................... 323/282 |
| 7,808,225 B2 | | 10/2010 | Burdenski et al. |
| 2001/0030528 A1 | * | 10/2001 | Ootani ........................ 323/272 |
| 2004/0196019 A1 | | 10/2004 | Schneider |
| 2006/0170043 A1 | * | 8/2006 | Liu et al. ....................... 257/341 |
| 2006/0239046 A1 | * | 10/2006 | Zane et al. ..................... 363/65 |

(Continued)

FOREIGN PATENT DOCUMENTS

CN 1938929 A 3/2007
DE 196 20 586 11/1997

(Continued)

OTHER PUBLICATIONS

International Search Report dated Dec. 12, 2008, from corresponding PCT application.

(Continued)

*Primary Examiner* — Adolf Berhane
*Assistant Examiner* — Gary Nash
(74) *Attorney, Agent, or Firm* — Young & Thompson

(57) ABSTRACT

The invention relates to power supplies where the output current is controllable. In prior art, there is a problem to provide both high rate of change in the current output and high efficiency. The solution of the present invention is based on combining current elements, whereby the current is controlled by switching the outputs of the current elements. The current elements can be implemented with e.g. buck converters, whereby the power dissipation is small.

14 Claims, 4 Drawing Sheets

(56) References Cited

U.S. PATENT DOCUMENTS

| | | | |
|---|---|---|---|
| 2006/0255778 A1* | 11/2006 | Moussaoui | 323/272 |
| 2006/0284606 A1* | 12/2006 | Chen et al. | 323/259 |
| 2006/0290332 A1* | 12/2006 | Condito | 323/272 |
| 2007/0007935 A1* | 1/2007 | Johnson | 323/282 |
| 2007/0170897 A1* | 7/2007 | Williams | 323/222 |
| 2008/0303495 A1* | 12/2008 | Wei et al. | 323/272 |
| 2008/0303499 A1* | 12/2008 | Chen et al. | 323/282 |
| 2009/0096436 A1* | 4/2009 | Sugahara et al. | 323/282 |
| 2011/0031953 A1* | 2/2011 | Kanbe et al. | 323/311 |

FOREIGN PATENT DOCUMENTS

| | | |
|---|---|---|
| DE | 10054339 A1 | 5/2002 |
| EP | 1388927 A2 | 2/2004 |
| JP | 2001286059 | 10/2001 |
| JP | 2004180500 | 6/2004 |
| JP | 2007116834 | 5/2007 |
| JP | 2007194798 | 8/2007 |
| WO | 2006/079219 | 8/2006 |
| WO | 2005/096481 | 10/2008 |

OTHER PUBLICATIONS

Finnish Search Report dated Apr. 21, 2008, from corresponding Finnish application.

Hoyerby et al: "High-Bandwidth, High-Efficiency Envelope Tracking Power Supply for 40W RF Power Amplifier Using Paralleled Bandpass Current Sources", Power Electronics Specialists Conference, 2005, PESC '05, IEEE 36th, IEEE, Jan. 1, 2005, pp. 2804-2809, Piscataway, NJ, USA LNKD-DOI:10.1109/PESC.2005.1582030, XP031000520.

European Search Report in Corresponding Application No. 08787765 Dated Aug. 26, 2010.

* cited by examiner

METHOD AND ARRANGEMENT FOR EFFICIENTLY GENERATING CURRENT WITH A HIGH RATE OF CHANGE

The invention relates to power supplies where the output current is controllable. The invention can be applied e.g. for providing supply current for radio transmitters etc.

BACKGROUND OF THE INVENTION

Various operating voltages are needed in electronic systems. Usually these operating voltages are generated by so called power supplies. Generally, power supplies are divided into so called linear power supplies and so called switch-mode power supplies. Power semiconductors are used in linear power supplies in so called linear state, i.e. both the current and the voltage affect simultaneously across them. The values of the current and the voltage change linearly when moving from one operating point to another. The advantages of the linear power supplies are fast response and accurate adjustment, by which e.g. accurate and fast adjustment of the output voltage is achieved. However, as a disadvantage they have high dissipation i.e. low efficiency. The dissipation is directly proportional to the product of the voltage and the current, which simultaneously affect across a power semiconductor. In the switch-mode power supplies, the power semiconductors are driven between two extreme points, i.e. the switch is totally open or totally close, in which case the voltage and the current do not influence simultaneously across it, whereby the dissipation remains low. However, in the switch-mode power supplies it also necessary to use inductive components for coupling between different voltage levels, which causes slowness because the current of inductive components, such as an inductor, cannot change unlimitedly fast.

Usually, the operating voltages of the electronic devices are constant. In some particular applications, such as a radio transmitters having good linearity, a fixed operating voltage nevertheless causes poor efficiency. This is because power dissipation is generated in the output stage, the dissipation of which is proportional to the difference between the fixed operating voltage and the transient output voltage. In another words, the output stage generates a desired output voltage by converting the additional voltage into dissipation. This kind of arrangement creates a low total efficiency, and lately methods have been evolved to improve this. One method of this kind is so called "envelope tracking" method, in which the voltage of the power supply output stage is controlled to correspond to the respective transient output voltage, in which case the power converted into the dissipation in the output stage gets smaller and the efficiency increases, which is a commonly desired characteristic. This kind of envelope tracking power supply is usually formed by connecting in parallel a switch-mode converter, which has a function to produce needed current with a good efficiency, and linear power supply, which has a function to take care of an accurate regulation of the output voltage. Since the main energy is handled with the switch-mode converter, the efficiency of the total system is high. In practice, the limited speed of the switch-mode converter causes an upper limit for the frequency of an alternating current component of efficiently generated electricity. In other words, above of the frequency of the certain generated electricity the linear power supply has to generate the most of the electricity, in which case the total efficiency is low. For example, circuits for generating electricity including a 20 MHz alternating current component have been disclosed in literature so that the total efficiency has decreased even under 50%. Considering particular radio transmitters, such as so called OFDMA transmitters (Orthogonal Frequency Division Multiple Access), it would be preferable that by envelope tracking circuit it would be possible to generate electricity with 60 MHz alternating current component with good efficiency.

In addition, electricity of various frequencies is needed in multiple applications, such as audio applications, i.e. music reproduction and electrical amplification, as well as, for example, in producing so called gradient field of magnet resonance imaging equipment. In these applications the prior art solutions cannot either generate adequate high frequency electricity components with sufficiently high efficiency.

It can be generally stated that the known methods for generating electricity are not able to generate electricity including components of sufficiently high frequency, with sufficiently high efficiency.

SUMMARY OF THE INVENTION

The object of the present invention is to achieve a solution for making generation of electricity including high frequency components more effective.

With the method and arrangement according to the invention electricity including high frequency components/high change rate electricity can be generated with a high efficiency.

In a preferred embodiment current is generated, which current is used together with the linear voltage amplifier to generate the operating power for the radio transmitter.

In a second embodiment of the method electricity is generated to be used for reproducing or amplifying audio signal.

In the third embodiment the method is used to generate current that forms gradient fields of a magnetic resonance imaging equipment.

BRIEF DESCRIPTION OF THE DRAWINGS

Next the invention will be described in more detail with reference to the following drawings, which are given as an indication and are not restricting, and in which.

DETAILED DESCRIPTION OF THE PREFERRED EMBODIMENTS

Figure 1:
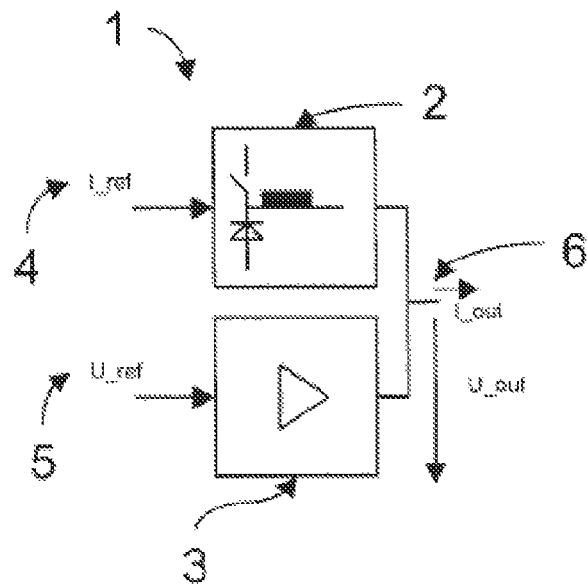
FIG. 1 illustrates indicatively commonly known envelope tracking circuit.

FIG. 1 illustrates a commonly known envelope tracking circuit 1, which consist of a parallel connection of a switch-mode converter 2 and a linear power supply 3. A current instruction 4 is input to the switch-mode converter 2 and a voltage instruction 5 is entered to the linear power supply 3, respectively, in which case desired output voltage and output current can be generated to the output point 6. A greater part of the output current is generated by the switch-mode converter 2, so high power dissipation is not created in the linear power supply 3. This is because the power dissipation of the linear power supply is proportional to the product of the voltage which influences across the linear power supply, and the pass-through current, whereby the current is zero in an ideal case when the current is passing through the switch-mode converter.

Figure 2:
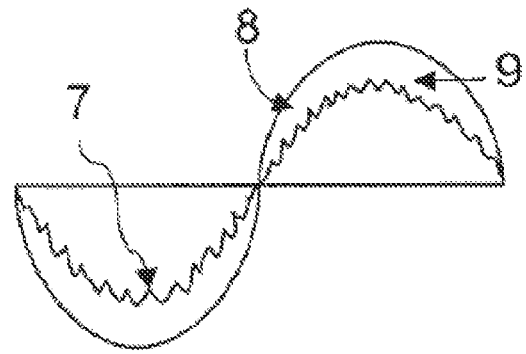
FIG. 2 illustrates indicatively current curve forms of the envelope tracking circuit.

FIG. 2 illustrates the generating of an alternating component of output current in FIG. 1. The main part of the output alternating current component is generated by the current of the switch-mode converter 7. The linear stage adds into this a suitable current component 9 so that the sum of the currents is the desired total output current 8. It is to be noted that there is a ripple component in the output current 7 of the switch-mode converter, whom the ripple component is therefore leveled by the output current 9 of the linear stage. Also in rapidly changing situations the linear stage gives a required fast transition current until the switch-mode converter sets to the new current value.

Figure 3:
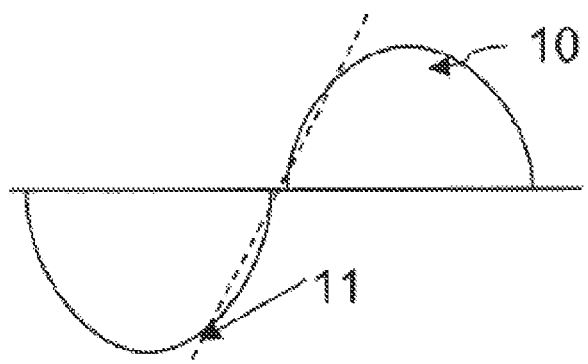
FIG. 3 illustrates the form of the sinusoidal signal and the point of its greatest ascending speed.

FIG. 3 illustrates the sinusoidal signal 10, which can be an alternating current component of a dc current supply. When examining the rate of change for generating these signals, it can be stated that if the signal 10 is in form of $A*\sin \omega t$, where a is the amplitude of the signal, $\omega$ is the angular frequency of the signal and t is time, the derivative of the signal over time can be presented $d/dt = A\omega \cos \omega t$. Technically, the maximum value of this derivative is most interesting. The maximum value is $A\omega$, because the maximum value of the $\cos \omega t$—term is one. In other words, when generating the signal 10 the rate of change 11 $A\omega$ has to be available. It is to be noted that FIGS. 2 and 3 only illustrate the alternating part of the current; the required output current has normally a major dc component which has a constant polarity even if there is are smaller components of changing currents.

Figure 4:
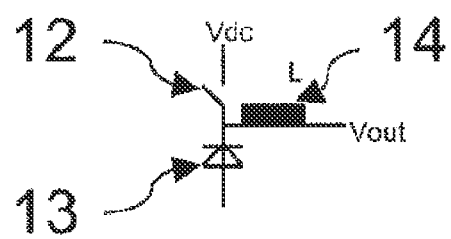
FIG. 4 illustrates indicatively so called buck-converter.

FIG. 4 illustrates the common switch-mode converter circuit, so called buck-converter, which consist of a controllable switch 12, a diode 13 and an inductor 14. This kind of converter is commonly used in the envelope tracking circuits so that the current of the inductor 14 is the desired output current of the switch-mode converter. It is essential to examine the maximal rate of change of the inductor 14 current, because it sets maximum frequency and maximum amplitude of the electrical signal component according to the FIG. 3.

Figure 5:
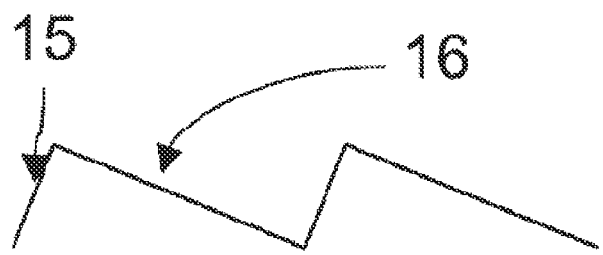
FIG. 5 illustrates indicatively current form of the inductor of so called buck-converter.

FIG. 5 illustrates the form of a current in the inductor of FIG. 4. The current consists of an ascending part 15 and a descending part 16. The ascending part of the current 15 corresponds the maximum ascending rate of change and in the case of the converter of FIG. 4, its value can be calculated value=$dI/dt=U/L$, where U is the value of the supply voltage Vdc and L is the inductance of the inductor 14. In other words, the rate of change could be increased by increasing the voltage or decreasing the inductance of the inductor. Often this cannot be done unlimitedly, because otherwise the ripple of the output current of the power supply grows too big and the efficiency drops because the linear power supply has to work again and to eliminate this ripple from the total output current.

Figure 6:
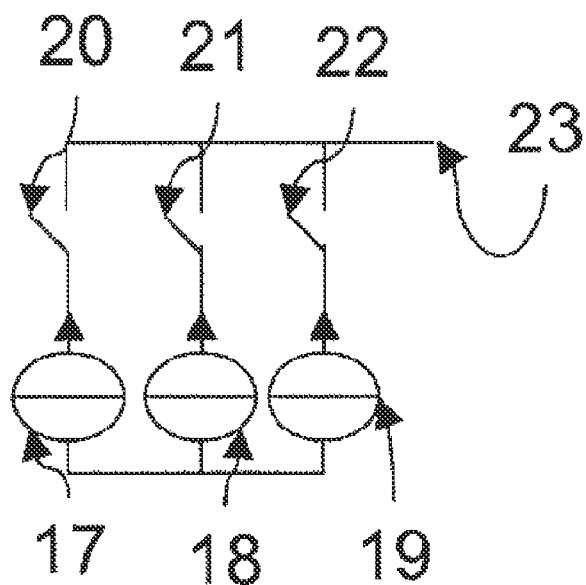
FIG. 6 illustrates indicatively an arrangement according to the invention for generating the current.

FIG. 6 illustrates an arrangement according to the invention to change the output current rapidly. In the circuit there are several separate current supplies 17, 18, 19, which are connected to the output point through the switches 20, 21, 22. The current of each current supply 17, 18, 19 is somewhat constant, in which case the total current of the output point 23 can be changed rapidly by opening and closing the switches 20, 21, 22 without having any particular speed requirements for the rate of change of the current of an individual current supply. It is preferable that the switches 20, 21, 22 and their control circuitry is capable of switching currents with at least 100 kHz, more preferably at least 1 MHz, and most preferably at least 2 MHz. This allows a combination of current change rates at the output and efficiency of operation which is far better than with prior art solutions.

By using binary weighting in the currents of the current supplies, for example, so that the current supply 17 is 1 A, the current supply 18 is 2 A and the current supply 19 is 4 A, the output current will be set digitally with 3 bits into desired value. This is a useful characteristic in digitally controlled systems.

Figure 7:
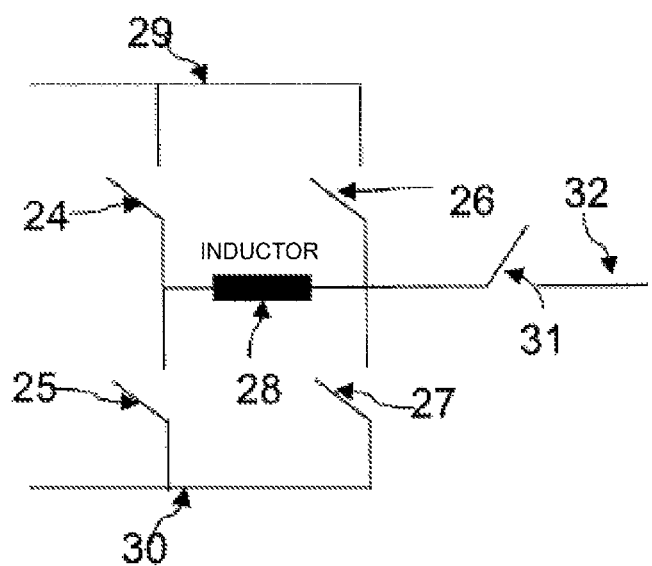
FIG. 7 illustrates indicatively an arrangement according to the invention for generating the current of the inductor.

FIG. 7 illustrates a circuit for setting current values of current supplies 17, 18, 19 of FIG. 6 into desired values. An inductor 28 is connected to the supply voltage, connected between points 29 and 30, by means of switches 24, 25, 26, 27 so that the desired current is generated to the inductor 28. Here, advantage can be taken from controlling means known by those skilled in art, such as peak current adjustment and hysteresis current adjustment. Hysteresis control means that the switches of the inductor are switched on the bases of the current in the inductor; the state of a switch changes when the current of the inductor exceeds or goes below the set value by predetermined threshold values. When it is desired to connect this current value to the output point 32, the switch 31 is closed, which is otherwise open. Alternatively, the current could be set to the adjustment value by other known means, such as by the means of the series resistor, or by other commonly known current adjustment methods. Also some other commonly known electrical element than an inductor could be used to generate the current element, for example an active circuit can generate a current element.

Figure 8:
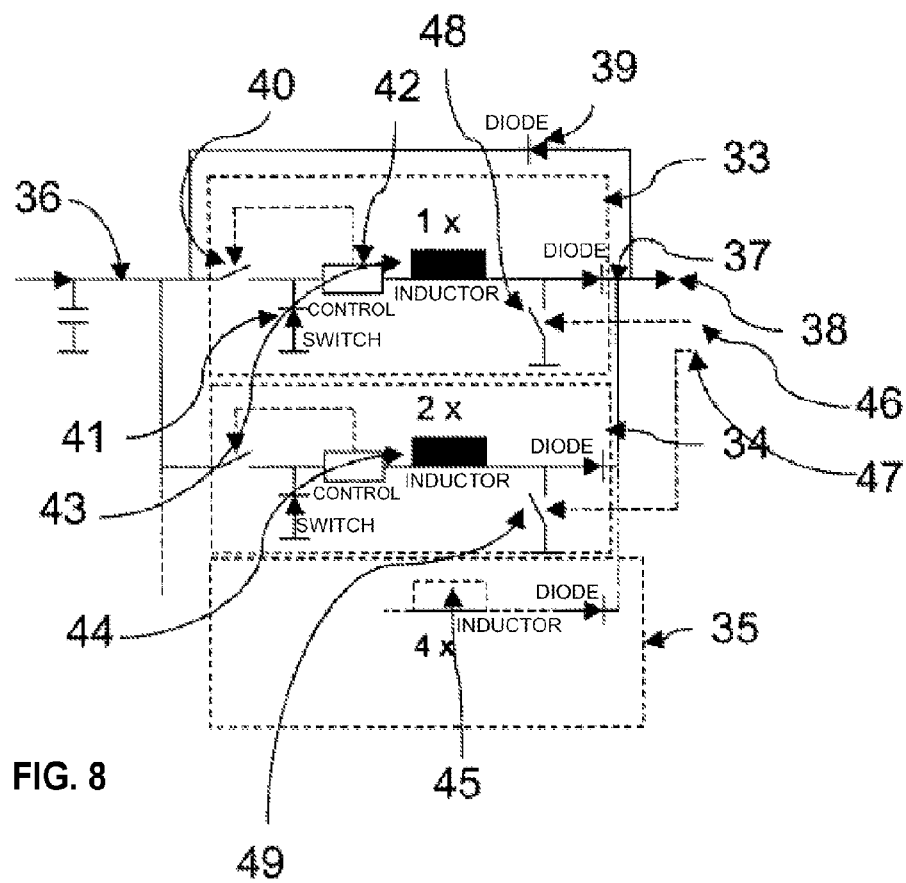
FIG. 8 illustrates indicatively an arrangement according to the invention for generating the current.

FIG. 8 illustrates also an efficient method according to the invention for generating a rapidly alternating current to the output point 38. The connection consists of the parallel current elements 33, 34, 35, which are fed from the supply voltage 36. For the clarity only two current elements 33 and 34 have been illustrated completely. It is to be noted that each current element 33, 34, 35 has an inductor 43, 44, 45. Binarily weighted current values 1×, 2×, 4× are developed for the inductors. The weight of the current values may be some other one as well, such as exponential or other technically useful weight. The current value is formed by switches 40, 41, which are driven by a suitable control 42. A suitable control method 42 for forming the current value to the inductor 43 is so called current hysteresis adjustment of prior art, in which the current resonates around the set value. As output switches of the current elements 33, 34 there are switches 48, 49 coupled between the other end of the inductor and ground, which switches, while being closed, pass the current of the inductor to the ground (or alternatively supply voltage or some other potential of low impedance). In this stage the current flows through the inductor with minimal losses/dissipation.

When the switches 48, 49 are opened, the current of the inductor of said current element flows through the diode, illustrated in the Figure, to the summing point 37 from which they flow to the output point 38. Other current elements have also similar couplings, and there may be more current elements than illustrated in the Figure. The output current of the current elements is now controllable simply by means of the controlling signals 46, 47 and in case of binarily weighted current the signals may be led straight at the pins of the digital signal processor controlling the system. Because the rate of change of the total current of the output current 38 depends now only on the switching speed of the coupler 48, 49, it is now possible to get the total output current rapidly changed. A protecting diode 39 is connected to the output point 38, which diode switches possible over-voltages back to the supply voltage 36. The current direction of the current elements may also be negative so that the current amount determined by the current elements is decreased from the summing point 37. The left end of the current elements is called an adjustment end and respectively the right end is called a load coupling end. However, the total output current has mainly a constant polarity even if the current polarities of the individual current elements would momentarily be different.

Figure 9:
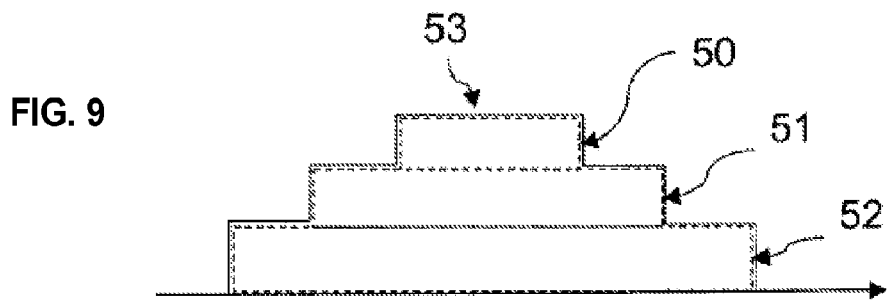
FIG. 9 illustrates indicatively the current generated from the current elements.

FIG. 9 illustrates generating a changing current 53 from current elements 50, 51, 52. For the clarity, linear i.e. the equal size current elements have been used here, but they may also be weighted some other way, such as binarily or exponentially. It can be seen in the Figure that because the current jumps into the new value right away at the time of change, fast rate of change is provided, with which it is possible to effectively generate even high frequency electricity components. The current values of the current elements may also be alternated when the coupling operates in the desired way. For example, the current values can be calibrated or their weights can be changed to the appropriate values at the time. A part of or all the current elements may also be switched off, for example, when the full output current is not needed for a long time, for example in the night time.

The invention claimed is:

1. A method for generating current with a high rate of change, comprising:
generating current by at least two separate current elements, each comprising switches and an inductor having an adjustment end and a load coupling end;
setting a current value of the inductor by switching the adjustment end between a supply voltage and ground through one or more first switches; and
switching the load coupling end to a load via a second switch when the second switch is in a first state, and connecting the load coupling end to the ground or the supply voltage when the second switch is in a second state,
wherein envelope tracking is applied such that the current elements are connected in parallel through the second switches to an output point when a current change with high rate of change is required at the load, and such that the current elements are connected to the ground or the supply voltage when the current of the current elements are not required at the load.

2. The method according to claim 1, wherein the current elements are binarily weighted so that a current value of a current element is two times a current value of a previous current element, respectively.

3. The method according to claim 1, wherein an output of the current elements are switched with a frequency of at least 100 kHz.

4. The method according to claim 3, wherein the output of the current elements is switched with a frequency of at least 1 MHz.

5. The method according to claim 4, wherein the output of the current elements is switched with a frequency of at least 2 MHz.

6. The method according to claim 1, wherein the adjustment end is connected to the supply voltage by a one of said one or more first switches and to the ground by a first diode, and the load coupling end is connected to the ground by the second switch and to the load by a second diode.

7. A method according to claim 1, wherein current hysteresis control is used for controlling the current of the current elements.

8. An arrangement for generating current with a high rate of change, the arrangement comprising:
at least two separate current elements each comprising switches and an inductor which has an adjustment end and a load coupling end;
one or more first switches configured to switch the adjustment end between a supply voltage and ground for setting a current value of the inductor; and
a second switch configured to connect a load coupling end between a load in a first state, and to connect the load coupling end to the ground or to the supply voltage in a second state,
wherein, for applying envelope tracking, the second switches are arranged to connect the current elements in parallel to an output point when a current change with high rate of change is required at the load, and to connect the current elements to the ground or the supply voltage when the current of the current elements are not required at the load.

9. The arrangement according to claim 8, wherein the current elements are binarily weighted so that the output current value of a current element is two times the current value of the previous current element, respectively.

10. The arrangement according to claim 8, further comprising:
means for switching the output of the current elements with a frequency of at least 100 kHz.

11. The arrangement according to claim 10, wherein the switching means switches the output of the current elements with a frequency of at least 1 MHz.

12. The arrangement according to claim 11, wherein the switching means switches the output of the current elements with a frequency of at least 2 MHz.

13. The arrangement according to claim 8,
wherein the load coupling end is switched between the load and the ground,
wherein the adjustment end is connected to the supply voltage by a one of said one or more first switches and to the ground by a first diode, and
wherein the load coupling end is connected to the ground by the second switch and to the load by a second diode.

14. The arrangement according to claim 8, further comprising:
means for controlling the current of the current elements with a hysteresis control.

* * * * *

UNITED STATES PATENT AND TRADEMARK OFFICE
CERTIFICATE OF CORRECTION

PATENT NO.         : 8,692,527 B2                                                   Page 1 of 1
APPLICATION NO.    : 12/676274
DATED              : April 8, 2014
INVENTOR(S)        : Ritamäki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
Twenty-ninth Day of September, 2015

Michelle K. Lee
*Director of the United States Patent and Trademark Office*